May 12, 1931.  C. F. SCHULTIS  1,804,814
PIPE COUPLING AND METHOD OF FORMING THE SAME
Filed Feb. 3, 1928    2 Sheets-Sheet 1
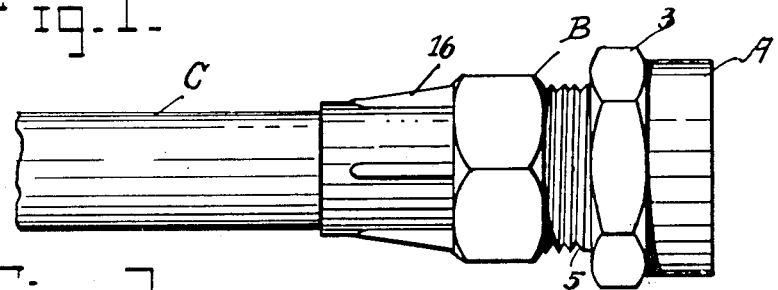
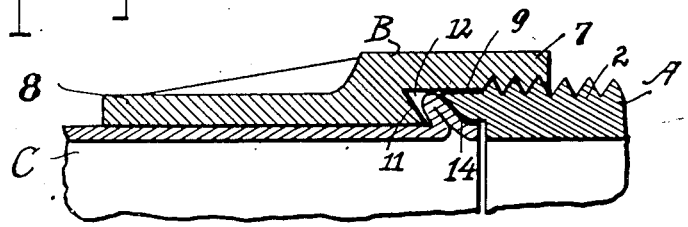
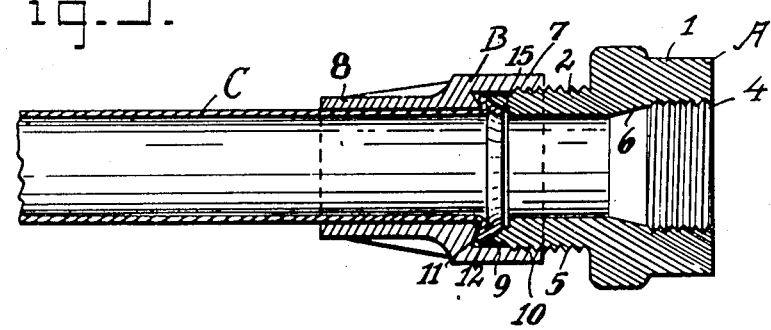
Inventor
C. F. Schultis
By Robt H Robb
Attorneys May 12, 1931.  C. F. SCHULTIS  1,804,814
PIPE COUPLING AND METHOD OF FORMING THE SAME
Filed Feb. 3, 1928  2 Sheets-Sheet 2
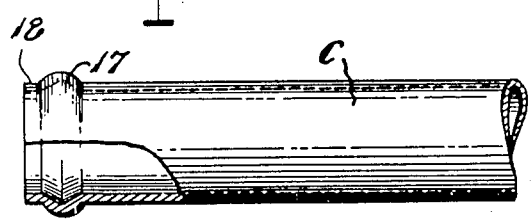
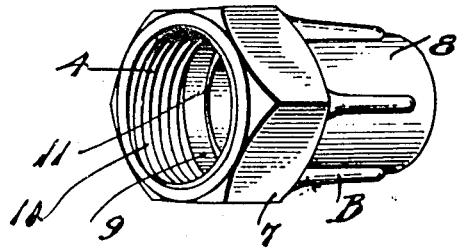 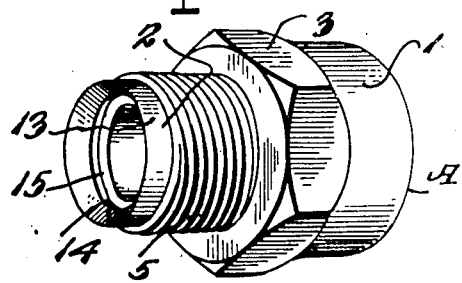
Inventor
C. F. Schultis
By Robb & Robb
Attorneys Patented May 12, 1931

1,804,814

UNITED STATES PATENT OFFICE

CHARLES F. SCHULTIS, OF CLEVELAND, OHIO, ASSIGNOR, BY DIRECT AND MESNE ASSIGNMENTS, TO THE SIMPLEX COPPER JOINT COMPANY, OF CLEVELAND, OHIO, A CORPORATION OF OHIO

PIPE COUPLING AND METHOD OF FORMING THE SAME

Application filed February 3, 1928. Serial No. 251,521.

The connecting of a copper tube or similar pipe member to a coupling generally involves the use of the so-called compression coupling of the type that clamps or compresses one end of the tube in the coupling. This type of coupling is commonly employed in places where the conditions are trying and the need for a positive and permanent coupling is emphatic. Particularly is it necessary that such a connection be leak-proof while controlling the distribution of fluids under high pressure.

The primary object of this invention is to provide a coupling of the type referred to which will remain leak-proof under all conditions, and permanent in every respect. More particularly, I propose to provide a connection between a copper tube and a pipe that is effected by deforming a portion of the pipe adjacent an extremity and clamping said portion rigidly in a coupling. The method of effecting the coupling herein set out plays an important part in my invention inasmuch as it is this method which insures the heretofore unequaled coupling between pipes of the nature of copper tubes and coupling members.

In carrying out my invention, a portion of the pipe adjacent the ends is deformed by a mechanism that is completely illustrated and described in my copending application, Serial No. 253,590 filed February 11, 1928. The end of the tube is then put in the coupling which is operated to further deform the portion previously worked on and clamp the same positively in the coupling.

A more particular object of the invention is to provide a coupling member having a groove therein in which a deformed portion of a pipe or tube may be compressed by a union of the coupling member with a complemental part. In embodying this idea in the construction of my coupling, an annular groove is formed by cutting away a shoulder adjacent an enlargement of the bore to provide a conical surface. This annular groove cooperates with a deforming cam or tapered surface carried by the other coupling member and compresses the portion of the pipe previously deformed into the groove wherein it is rigidly clamped.

My invention is further characterized by the novel method of setting up a pipe connection embodied therein. Generally speaking, this method lies in first breaking down the metal of a pipe adjacent to one end thereof to form an annular V-shaped groove or bead, using the machine referred to for this purpose, and then applying a coupling to the tube so that it substantially encloses this deformed portion of the latter, and then operating the coupling to further deform the predeformed portion of the pipe, and clamp it in a suitable annular groove in the coupling.

Another noteworthy feature of this invention is the provision of supplemental wrench engaging means on one of the coupling members which also functions to strengthen the coupling in a manner that permits the reduction of the amount of material used therein. More specifically, one of the coupling members that receives the end of a tube has an elongated sleeve portion integral with a head or main body portion. In my novel coupling, this sleeve portion is also connected to the head through the medium of tapered ribs spaced circumferentially around the coupling members. This construction materially lightens the weight of the coupling without noticeably reducing the strength thereof and at the same time provides the wrench engaging means of this character other than the polygonal conformation commonly availed of.

Further and more detailed objects of the invention will in part become apparent and in part be hereinafter stated as the description of the invention proceeds. For a complete understanding thereof, reference may be had to the following description and accompanying drawings, in which Figure 1 is a view in side elevation of a coupling with a portion of the tube connected therewith.

Figure 2 is an enlarged detail view in section bringing out the manner in which the deformed pipe is held by the coupling member.

Figure 3 is a longitudinal sectional view through the middle of the coupling shown in Figure 1.

Figure 4 is a view in side elevation of a tube one end of which has been deformed prior to insertion in the coupling.

Figure 5 is a view in perspective of one of the coupling members, and

Figure 6 is a view in perspective of the other member.

Throughout the various figures of the drawings like reference characters denote corresponding parts.

While a preferred form of the invention is herein set forth, it is to be understood that I am not to be limited to the exact construction illustrated and described herein because various modifications of the details may be provided in putting the invention into practice within the purview of the appended claims.

The parts of a coupling with which my invention is particularly related comprise the male member A and female member B. These members are adapted to cooperate to connect therewith a copper tube shown fragmentarily at C.

The male member A comprises two portions of comparatively large and small dimensions as shown at 1 and 2. Intermediate these two portions this coupling member is provided with a wrench engaging surface in the form of a polygonal head 3. The large portion 1 is provided with interior screw threads 4 by which the coupling may be joined to any desired fixture. The smaller portion of the member A is exteriorly threaded at 5 to provide for its connection with the mating coupling member B. The difference in the diameter of the bore of the portions 1 and 2 is such as to provide a substantially smooth bore through the coupling member when one end of a pipe is inserted into the coupling member A at 4. If desired, these bores of various diameters may be connected by the tapered portion 6.

The female coupling member B consists of a head portion 7 of suitable polygonal formation to provide a wrench engaging surface, and the sleeve portion 8. The bore of the sleeve 8 is enlarged in the head 7 as shown at 9 and threaded at 10 to receive one end of the male coupling member A. The bore on the sleeve 8 and enlarged bore 9 are connected by a conical surface 11 that provides an annular tapered groove 12. The portion 2 of the coupling member A projecting into the member B is free from threads at its extremity to provide a cylindrical portion 13 that engages with the complemental surface 9 on the member B. Interiorly the pipe is tapered at 14 at an angle substantially the same as the angle of the conical surface 11. The bore through the portion 2 is also slightly enlarged interior of the cylindrical portion 13 as shown at 15 to provide a continuously smooth bore when the copper tube C is held in the coupling.

The connection between the sleeve portion 8 and head 7 of the coupling member B is reinforced by ribs 16 which taper at one end from the size of the head 7 down to the size of the sleeve 8 at the other. This construction provides a comparatively light, strong coupling member, and as previously mentioned, the ribs 16 may be availed of for wrench engaging means should the occasion arise for such usage.

When a tube is to be connected to the coupling, its end is first broken down or deformed by the mechanism described in my copending application previously referred to, to provide a V-shaped groove or annular bead 17 as shown in Figure 4. As a result of being operated on by the mechanism aforesaid, the periphery of the end of the tube will be serrated as shown at 18. In the actual commercial application of my coupling, the method of use will probably entail the slipping on of the coupling member B over the tube C prior to the deformation of the end of the pipe to provide the bead 17. However, should only a comparatively short length of pipe, having both its ends free, be subject to the process of connection to the coupling, one end may first be deformed to provide the bead, after which the other end is passed through the member C to position the bead 17 adjacent the groove 12. This last mentioned method will doubtlessly not be availed of to the extent of the first described one.

Upon the metal of the pipe being broken down by the apparatus referred to to provide the bead 17 which in reality has an almost annular V-shaped formation, the parts A and B of the coupling are joined together by proper rotation to cause cooperation of the screw threads 5 and 10. As the couplings are threaded together, the tapered surface 14 is moved towards the groove 12 and cams or deforms the metal of the bead forcing the latter into the groove 12 and when the coupling has been screwed up tight, this bead will have assumed the shape shown clearly in Figure 3 in which the opposite walls of the bead are in substantial contact with one another. It is particularly noteworthy that this method of deforming the tube to provide a portion clamped by the coupling, takes advantage of the resiliency inherent in a piece of metal folded back on itself to provide the desired sealing effect. Leaving the portion of the tube at the extremity thereof undeformed and of the same diameter as the remainder of the tube adds materially I claim as new and desire to secure by Letters 1. In a pipe connection of the class de- Patent in the United States, is—

Having thus described my invention, what to the effectiveness of this connection because this portion engages in the bore of the coupling member A.

scribed, the combination, with a tube having a radial flange spaced from the end thereof, of a coupling comprising two coupling members, one of said coupling members having a seat to receive the undeformed end of the tube to provide a uniform continuous bore through the tube and coupling, each of the members having a conical surface between which the flange on the tube is clamped, said conical surfaces being inclined in the same direction and said flange consisting of a ply of the material of the tube.

2. In a pipe connection of the class described, the combination with a coupling member having clamping means therein, of a tube having an integral flange adjacent to but not at one end thereof and at an angle to a plane perpendicular to the axis of the tube, said flange comprising a portion of the tube bent back upon itself and held in the clamping means in the coupling member, the opposite walls of the flange being pressed together to provide a substantially continuous bore.

In testimony whereof I affix my signature.

CHARLES F. SCHULTIS.